United States Patent Office
3,829,443
Patented Aug. 13, 1974

3,829,443
SYNTHESIS OF 3-(3'-CARBOXY - 4' - HYDROXY-1'-NAPHTHYL) - 3 - (3''-CARBOXY-4''-HYDROXY-1''-NAPHTHYL)NAPHTHALIDE
Henry Bader, Newton Center, and Susan C. January, Wellesley Hills, Mass., assignors to Polaroid Corporation, Cambridge, Mass.
No Drawing. Filed Feb. 28, 1973, Ser. No. 336,619
Int. Cl. C07d 5/06
U.S. Cl. 260—343.2 R    13 Claims

ABSTRACT OF THE DISCLOSURE

Carboxy-substituted 1-naphthol naphthalide indicator dyes are prepared by reacting a 2-carboxy-1-naphthol and a 3-acyloxy-3-(3'-lower carboalkoxy-4'-hydroxy-1'-naphthyl)naphthalide in the presence of a catalyst having a high dipole moment to form the corresponding dye precursor which is then hydrolyzed to yield the corresponding indicator dye product.

BACKGROUND OF THE INVENTION

1. Field of the Invention

This invention relates to a method of preparing naphthalide indicator dyes, and in particular, it relates to the synthesis of certain 1-napthol napthalides useful as reagents in photography.

2. Description of the Prior Art

Copending U.S. Patent Application Ser. No. 103,865 of Myron S. Simon filed Jan. 4, 1971 discloses and claims certain indicator dyes derived from 1-naphthols which find particular utility as optical filter agents in photographic processes for protecting an exposed photosensitive material from post-exposure fogging during development in the presence of incident light. Specifically, the 1-naphthol indicator dyes disclosed therein comprise, 3,3-disubstituted phthalides and naphthalides wherein the 3,3 substituents are 4'-hydroxy-1'-naphthyl radicals at least one and preferably both of which possess a hydrogen-bonding group, such as, a carboxy, hydroxy, sulfonamido or sulfamoyl group substituted on a carbon atom adjacent to the 4'-hydroxy group. Among such dyes are phthalides and naphthalides wherein one or both of the 4'-hydroxy-1'-naphthyl radicals are substituted with a carboxy group in the 3'-position and which additionally may be substituted with an immobilizing group to render the dye substantially non-diffusible in a given photographic processing composition.

Various methods have been employed in the synthesis of the aforementioned indicator dyes including the carboxy-substituted 1-naphthol dyes. For example, carboxy-substituted 1-naphthol naphthalide indicators have been synthesized by reacting (a) a 2-carboxy-1-naphthol and (b) a 3-Z-3-(3' - carboalkoxy - 4' - hydroxy-1'-naphthyl) naphthalide intermediate wherein Z is a leaving group, in the presence of an acid catalyst, such as, a Lewis acid or in the presence of a basic catalyst, such as, a non-water producing base having a pKa of not less than about 2. The dye precursor thus obtained is then hydrolyzed to yield the corresponding indicator dye product.

One method found particularly useful in preparing these dyes comprises the utilization of a monoester as the naphthalide intermediate in a base-catalyzed reaction with the selected 1-naphthol, as disclosed and claimed in copending U.S. Patent Application Ser. No. 314,097 of Yunn H. Chiang and John W. Sparks filed Dec. 11, 1972. In a preferred embodiment, a 3-acetoxy-3-(3'-carboalkyloxy-4'-hydroxy-1'-naphthyl) napthalide and a 2-carboxy-1- naphthol are reacted in the presence of a catalytic amount of non-water producing base having a pKa of not less than about 2 to form the corresponding 3-(3'-carboalkoxy - 4' - hydroxy-1'-naphthyl)-3-(3''-carboxy-4''-hydroxy-1'''-naphthyl)naphthalide dye precursor. The carboalkoxy group of the dye precursor is then converted to a carboxy group to yield the corresponding indicator dye product. In a particularly preferred embodiment, the 2-carboxy-1-naphthol reacted with the monoacetate intermediate contains an aliphatic substituent that may be used to adjust the mobility characteristics of the dye product in a particular medium.

The present invention is concerned with another method of synthesizing the aforementioned carboxy-naphthol naphthalide dyes which comprises catalyzing the reaction of monoester intermediate and carboxy-naphthol with certain non-acidic, non-basic compounds characterized by their high dipole moments.

SUMMARY OF THE INVENTION

It is, therefore, the primary object of the present invention to provide a method of synthesizing 1-naphthol naphthalide indicator dyes.

Other objects of this invention will in part be obvious and will in part appear hereinafter.

The invention accordingly comprises the processes involving the several steps and the relation and order of one or more of such steps with respect to each of the others, and the products and compositions possessing the features, properties and the relation of elements which are exemplified in the following detailed disclosure, and the scope of the application of which will be indicated in the claims.

According to the present invention, carboxy-substituted 1-naphthol naphthalides are synthesized by condensing (a) a 2-carboxy-1-naphthol and (b) an intermediate, 3-OX-3-(3' - lower carboalkoxy-4'-hydroxy-1'-naphthyl) naphthalide wherein X is an acyl group, in the presence of a catalytic amount of a specific high dipole moment compound to yield the corresponding dye precursor. The lower carboalkoxy group of the dye precursor is then converted to a carboxy group to yield the corresponding dye product.

For a fuller understanding of the nature and objects of the invention, reference should be had to the following detailed description.

DESCRIPTION OF THE PREFERRED EMBODIMENTS

It has been found that by-product formation resulting from competing side reactions may be substantially reduced not only in a base-catalyzed condensation of a 2-carboxy-1-naphthol and a dye intermediate by employing as the intermediate, a 3-OX-3-(3'-lower carboalkoxy-4'-hydroxy-1'-naphthyl)naphthalide wherein X is an acyl radical derived from an organic carboxylic acid, aromatic or aliphatic but also in a condensation catalyzed by specific high dipole moment compounds which are non-basic and non-acidic. Specifically, the method of preparing carboxy-substituted 1-naphthol naphthalides according to the present invention comprises:

(A) reacting (a) a 3-OX-3-(3'-lower carboalkoxy-4'-hydroxy-1'-naphthyl)naphthalide wherein X is an acyl radical derived from a carboxylic acid and (b) a 2-carboxy-1-naphthol, unsubstituted or substituted with an aliphatic group in a molar ratio of about 1.0–1.5:1 in inert organic solution at a temperature not exceeding about 85° C. in the presence of a catalytic amount of a compound chosen from among substantially neutral organic compounds with a dipole moment above 3.7 or a dielectric constant of at least 30 to form the corresponding 3-(3' - lower carboalkoxy-4'-hydroxy-1'-naphthyl)-

3-(3″-carboxy-4″-hydroxy-1″-naphthyl)naphthalide dye precursor and (B) hydrolyzing said dye precursor to form the corresponding 3-(3′-carboxy-4′-hydroxy-1′-naphthyl)-3-(3″-carboxy-4″-hydroxy-1″-naphthyl)naphthalide dye product.

Unlike other naphthalide intermediates where the leaving group is, for example, an ether, the subject intermediates containing an ester leaving group are unique in that they are capable of existing in substantially complete equilibrium with the corresponding dehydro intermediate, i.e., quinone methide and thus, have little, if any, tendency to form irreversible O-alkylation and O-acylation by-products. As shown in the following scheme, the intermediates employed in the present method, as illustrated by a monoacetate intermediate, undergo an irreversible C-alkylation to produce the desired dye precursor but undergo reversible O-alkylation and O-acylation reactions. Because of the highly reversible nature of these main side reactions, conversion to dye precursor is substantially increased while by-product formation from competing side reactions is substantially reduced so that the dye product ultimately may be recovered in better yields and higher purity. To obtain the dye product, the dye precursor resulting from the C-alkylation in the following scheme is hydrolyzed by treating with aqueous alkali to convert the carbomethoxy to a free carboxy group.

The aliphatic group, branched or straight chain, may be alkyl, such as methyl, ethyl, isopropyl, butyl, t-butyl, hexyl, dodecyl, octadecyl or eicosanyl; alkenyl, such as, 3-butenyl, 2-methyl-1,3-butadienyl, 2-hexenyl and 9-octadecenyl; alkoxy, such as, ethoxy, butoxy, 1-ethoxy-2-(β-ethoxyethoxy), hexyloxy, dodecyloxy, and octadecyloxy; and alkoxyalkyl, such as, methoxyethyl, methoxyethoxyethyl, butoxydodecyl and ethoxyethoxyhexadecyl. Also, the aliphatic group may be substituted with a solubilizing group, i.e., the alkyl, alkenyl, alkoxy and alkoxyalkyl groups enumerated above may be substituted with a solubilizing group, e.g., —OH, —COOH and —SO₃H.

Specific examples of 1-naphthol indicator dyes that may be prepared according to the method of the present invention are as follows:

(1) 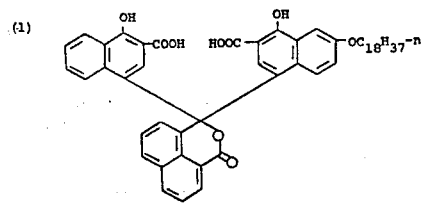

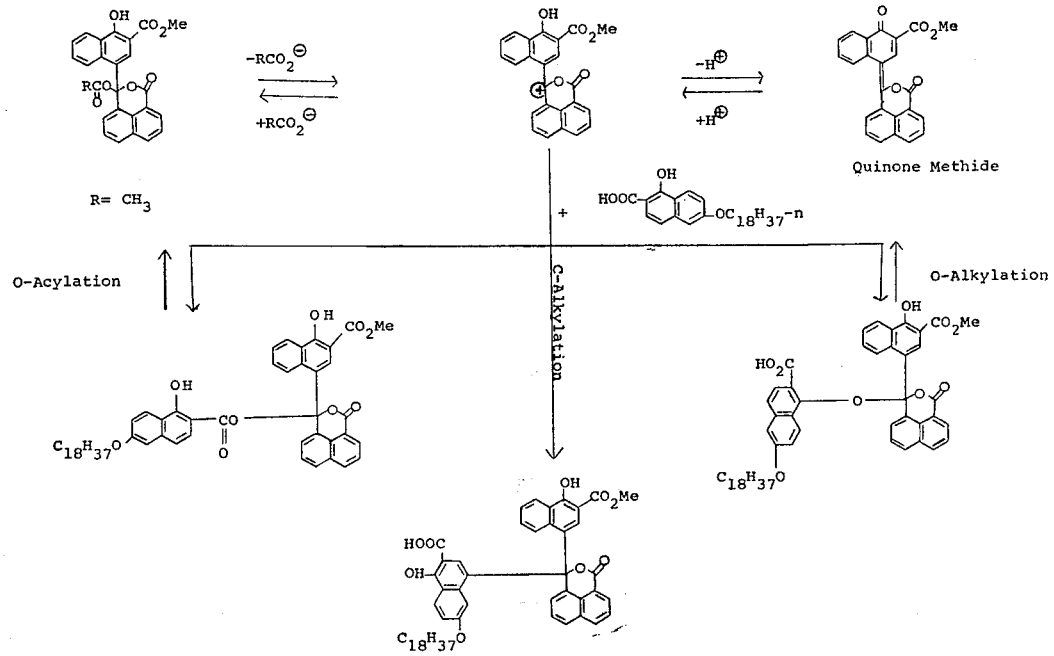

Though the method of the present invention may be used in the synthesis of 1-naphthol naphthalides, in general, it finds particular utility in the synthesis of indicator dyes as represented by the formula:

(I) 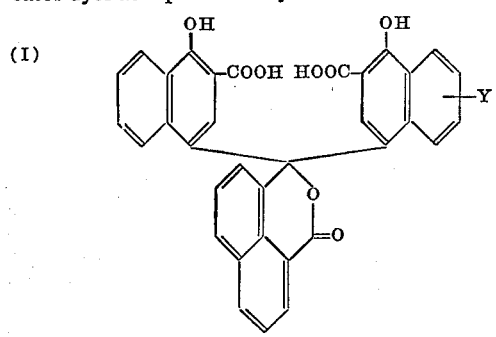

wherein Y is hydrogen or an aliphatic group usually containing up to about 20 carbon atoms.

(2) 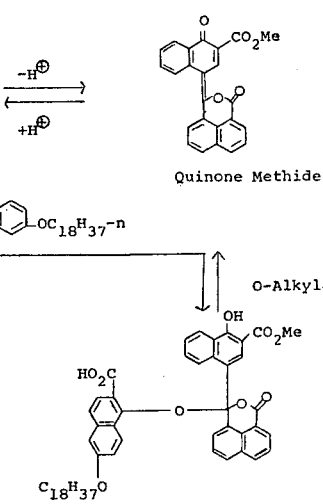

(3) 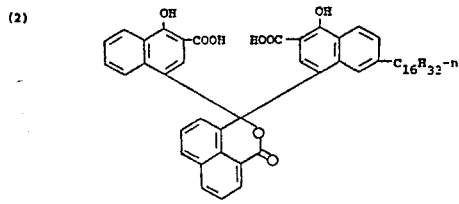

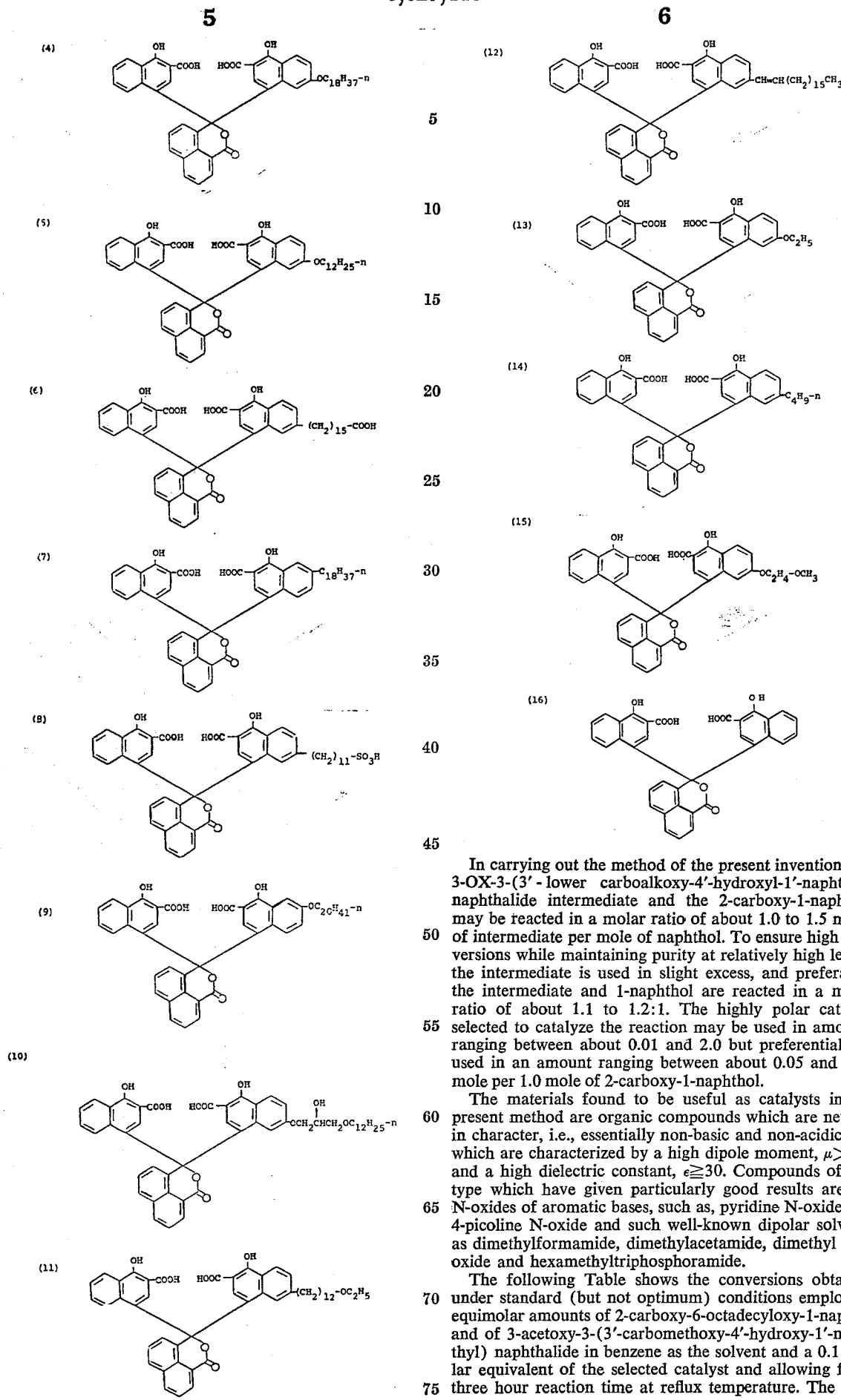

In carrying out the method of the present invention, the 3-OX-3-(3' - lower carboalkoxy-4'-hydroxyl-1'-naphthyl) naphthalide intermediate and the 2-carboxy-1-naphthol may be reacted in a molar ratio of about 1.0 to 1.5 moles of intermediate per mole of naphthol. To ensure high conversions while maintaining purity at relatively high levels, the intermediate is used in slight excess, and preferably, the intermediate and 1-naphthol are reacted in a molar ratio of about 1.1 to 1.2:1. The highly polar catalyst selected to catalyze the reaction may be used in amounts ranging between about 0.01 and 2.0 but preferentially is used in an amount ranging between about 0.05 and 0.15 mole per 1.0 mole of 2-carboxy-1-naphthol.

The materials found to be useful as catalysts in the present method are organic compounds which are neutral in character, i.e., essentially non-basic and non-acidic and which are characterized by a high dipole moment, $\mu > 3.7$, and a high dielectric constant, $\epsilon \geq 30$. Compounds of this type which have given particularly good results are the N-oxides of aromatic bases, such as, pyridine N-oxide and 4-picoline N-oxide and such well-known dipolar solvents as dimethylformamide, dimethylacetamide, dimethyl sulfoxide and hexamethyltriphosphoramide.

The following Table shows the conversions obtained under standard (but not optimum) conditions employing equimolar amounts of 2-carboxy-6-octadecyloxy-1-naphtol and of 3-acetoxy-3-(3'-carbomethoxy-4'-hydroxy-1'-naphthyl) naphthalide in benzene as the solvent and a 0.1 molar equivalent of the selected catalyst and allowing for a three hour reaction time at reflux temperature. The conversions to dye precursor are compared to the non-catalyzed reaction.

TABLE

| Catalyst | Dipole moment | Dielectric constant | Conversion, percent by wt. |
| --- | --- | --- | --- |
| Dimethylformamide | 3.82, 3.90 | 36.7 (25°) | 31 |
| Dimethyl sulfoxide | 4.03, 4.3 | 48.9 (20°) | 56 |
| Pyridine N-oxide | 4.19 | | 58 |
| 4-picoline N-oxide | 4.50, 4.97 | | 81 |
| Hexamethyltriphosphoramide | 4.3, 5.3 | 30.0 (25°) | 78 |
| None | | | 10 |

It is believed that the condensation between a 1-naphthol and a monoacetate intermediate, as shown in the previous reaction scheme, can be facilitated in two different ways, namely, by bringing either of the two reactants into a more reactive form. Strong bases, such as, triethylamine and lithium hydride are believed to convert the 1-naphthol (or 1-naphthol-2-carboxylic acid) to its anion which through resonance, would lead to increased electron density in the 4-position and therefore facilitate C-alkylation as shown below:

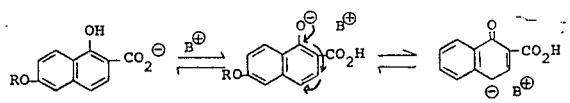

The highly polar catalysts defined above being substantially neutral would not be expected to contribute to such an effect. It is believed that they function in a different manner by activating the carbonium ion derived from the monoacetate intermediate by solvating it. This separates the carbonium ion from its acetate ion, producing a more reactive "naked" species as opposed to an ion-pair. Such a reactive molecule could be visualized, e.g., as shown in the following formula:

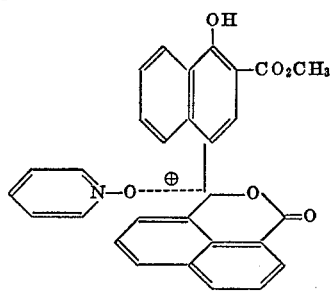

As the reaction media, any inert organic liquid that is a solvent for the reactants may be employed. Suitable organic solvents include acetonitrile, methyl ethyl ketone, hexane, 1,4 - dioxane, tetrahydrofuran, benzene, toluene, xylene, cyclohexane, methylene chloride, t-butanol and dimethoxyethane. However, the highest yields were obtained using aromatic hydrocarbons, such as, benzene or toluene.

For achieving practical reaction times, the reaction is conducted at elevated temperatures. However, to prevent decarboxylation of the naphthol reactant, the temperature should not exceed about 85° C., and usually, the reaction temperature ranges between about 60° and 85° C.

Because of the moisture sensitivity of the naphthalide intermediates, the condensation should be conducted under substantially anhydrous conditions, and though not essential, the reaction is preferably conducted under an inert atmosphere, for example, nitrogen.

The dye precursor thus obtained may be hydrolyzed, for example, by treating with an alkaline hydroxide in aqueous or aqueous-organic solution to convert the 3'-carboalkoxy to a 3'-carboxy group to yield the desired indicator dye product. The alkaline hydroxide may be an alkaline earth hydroxide, such as calcium or barium hydroxide, or preferably, an alkali metal hydroxide, such as, sodium or potassium hydroxide. Any water-miscible organic liquid may be used to form the aqueous-organic solution, for example, alcohols, such as ethanol, methanol, isopropanol, or water miscible ethers, for example, 1,2-dimethoxyethane or tetrahydrofuran.

Though the dye precursor isolated from the reaction solution may be hydrolyzed directly to the corresponding indicator dye product, it may be purified, for example, by crystallization of the crude material in an appropriate solvent prior to the hydrolysis step. Suitable solvents include alcohols, such as, isopropanol; combinations of alcohols with chlorinated hydrocarbons, such as, isopropanol and methylene chloride mixture; or with ketones, such as, methanol and acetone mixture; and combinations of nitriles with ethers, esters, ketones or hydrocarbons, such as, mixtures of acetonitrile with dimethoxyethane, n-butyl formate, methyl ethyl ketone or benzene.

The 2-carboxy-1-naphthols employed in the subject method may be represented by the formula:

(II)

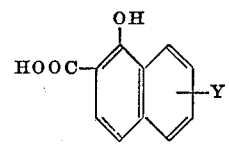

wherein Y has the same meaning given in formula I above.

Among the naphthols which are particularly useful in the production of indicator dyes that are relatively or substantially immobile in a given solution are the alkoxy-substituted 2-carboxy-1-naphthols which form the subject matter of copending U.S. Patent Application Ser. No. 383,037 filed July 26, 1973, a continuation-in-part of Serial No. 174,171 of Richard B. Greenwald filed August 19, 1971, now abandoned. These naphthols may be synthesized by treating a 1,6- or 1,7-naphthalenediol with an acetylating agent in the presence of a Lewis acid catalyst to yield the corresponding 2-acetyl compound followed by oxidizing the 2-acetyl to a 2-carboxy group and reacting the 2-carboxy compound with an alkyl halide to yield the 2-carboxy-6- (or 7-) alkoxy-1-naphthol. These naphthols also may be prepared by treating a 1,6- or 1,7-naphthalenediol in solution in an aprotic solvent with carbon dioxide in the presence of a strong base to form the corresponding 2-carboxy compound which is then reacted with an alkyl halide to yield the alkoxy-substituted 2-carboxyl-1-naphthol.

The naphthalide intermediates employed in the subject method may be represented by the formula:

(III)

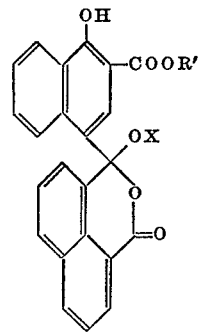

wherein X is an acyl radical of an organic di- or monocarboxylic acid, aromatic or aliphatic including branched or straight chain saturated or unsaturated aliphatic acids and R' is lower alkyl containing 1 to 4 carbon atoms, e.g., ethyl, propyl, isopropyl, n-butyl, t-butyl, and preferably, methyl. Typical acyl radicals are those derived from acids, such as, benzoic acid, phthalic acid, isophthalic acid, cinnamic acid, α - naphthoic acid, β - naphthoic acid, acetic acid, butyric acid, caproic acid, capric acid, malonic acid, glutaric acid, sebacic acid, acrylic acid, crotonic acid, vinylacetic acid, methacrylic acid, maleic acid, fumaric acid, muconic acid and so forth. The acid may be unsubstituted or substituted with, for example, amino, hydroxy, halo, mercapto, nitro, cyano, lower alkyl, lower alkoxy, acetyl, phenyl, phenyl substituted with methoxy, nitro, halo or cyano, phenoxy and phenoxy substituted with nitro, halo or cyano. Particularly useful because of their convenience and economy of manufacture are the monoester intermediates,

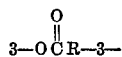

(3'-COOR'-4'-hydroxy-1'-napththyl)naphthalides wherein R is an alkyl group containing 1 to 10 carbon atoms, particularly unsubstituted and mono-substituted alkyl derived from a saturated aliphatic monocarboxylic acid, RCOOH.

The above intermediates may be prepared according to the method of copending U.S. Patent Application Serial No. 314,098 of Yunn H. Chiang filed Dec. 11, 1972 by reacting a 3-hydroxy-3-(3'-lower carboalkoxy-4'-hydroxy-1'-naphthyl)naphthalide and an acid anhydride of an organic carboxylic acid having a pKa between about 2.5 and 5.0 in an inert organic solvent in the absence of a strong acid or a base and/or prepared according to the method of copending U.S. Patent Application Serial No. 314,095 of Michael H. Feingold also filed Dec. 11, 1972 by reacting a 3-(3'-lower carboalkoxy-4'-oxo - 1' - naphthylidene)naphthalide and an organic carboxylic acid. Illustrative acids which may comprise the acyl radical include the following:

| | |
|---|---|
| Acetic | Dihydroxybenzoic(3,4-) |
| Acetoacetic | Dihydroxybenzoic(3,5-) |
| Acrylic | Dimethylglycine |
| α-Aminoacetic (glycine) | Diphenylacetic |
| Angelic | Ethylbenzoic |
| Adipic | Ethylphenylacetic |
| p-Aminobenzoic | Fluoroacetic |
| Anisic | Fluorobenzoic |
| o-β-Anisylpropionic | Fumaric |
| m-β-Anisylpropionic | Glutaric |
| p-β-Anisylpropionic | Heptanoic |
| n-Butyric | Hexanoic |
| iso-Butyric | o-Hydroxybenzoic |
| α-Aminobutyric | m-Hydroxybenzoic |
| n-Caproic | p-Hydroxybenzoic |
| iso-Caproic | β-Hydroxybutyric |
| Chloroacetic | γ-Hydroxybutyric |
| o-Chlorobenzoic | β-Hydroxypropionic |
| m-Chlorobenzoic | Iodoacetic |
| p-Chlorobenzoic | o-Iodobenzoic |
| α-Chlorobutyric | m-Iodobenzoic |
| β-Chlorobutyric | Lactic |
| Benzoic | Lysine |
| Bromoacetic | Mercaptoacetic |
| o-Bromobenzoic | β-Mercaptopropionic |
| m-Bromobenzoic | Methoxyacetic |
| α-Bromocaproic | β-Methoxypropionic |
| γ-Chlorobutyric | Muconic |
| o-Chlorophenoxyacetic | Maleic |
| m-Chlorophenoxyacetic | Methacrylic |
| p-Chlorophenoxyacetic | o-Nitrobenzoic |
| o-Chlorophenylacetic | m-Nitrobenzoic |
| m-Chlorophenylacetic | p-Nitrophenylacetic |
| p-Chlorophenylacetic | o-β-Nitrophenylpropionic |
| β-(o-Chlorophenyl)propionic | p-β-Nitrophenylpropionic |
| | Nonanic |
| β-(m-Chlorophenyl)propionic | Octanoic |
| | Phenylacetic |
| β-(p-Chlorophenyl)propionic | o-Phenylbenzoic |
| | γ-Phenylbutyric |
| α-Chloropropionic | α-Phenylpropionic |
| Crotonic | Pimelic |
| Cyanoacetic | Propionic |
| γ-Cyanobutyric | iso-Propylbenzoic |
| o-Cyanophenoxyacetic | Sebacic |
| m-Cyanophenoxyacetic | Succinic |
| p-Cyanophenoxyacetic | Toluic (o-, m-, p-) |
| Cyanopropionic | Trihydroxybenzoic (2,4,6-) |
| Dibromoacetic | Trimethylacetic |
| Dichloroacetic | n-Valeric |
| Dihydroxybenzoic(2,2-) | iso-Valeric |
| Dihydroxybenzoic(2,5-) | |

The aliphatic and the aromatic anhydrides can be prepared by the many methods known to the art, such as acylation of carboxylic acids by aryl halides, interaction of acyl halides and salts of carboxylic acids, interaction of acyl halides with acetic anhydride, etc. (cf. Romeo B. Wagner and Harry D. Zook, Synthetic Organic Chemistry, John Wiley & Sons, Inc. 1953, p. 558).

The 3-hydroxy-3-(3'-lower carboalkoxy-4'-hydroxy-1'-naphthyl)naphthalides may be synthesized by forming a complex of a 1-hydroxy-2-alkyl naphthoate (2-carboalkoxy-1-naphthol) by reacting the naphthoate with anhydrous aluminum chloride followed by the addition of solvent, such as, nitrobenzene. Naphthalyl dichloride (3, 3-dichloronaphthalide) is then added to the solution containing the naphthoate as an activated complex to form the 3-hydroxy-(3'-lower carboalkoxy - 4' - hydroxy - 1'-naphthyl)naphthalide.

The following examples are given to further illustrate the present invention and are not intended to limit the scope thereof.

Example 1

Preparation of the compound of formula (4).

The intermediate employed in this example was 3-acetoxy-3-(3'-carbomethoxy - 4'-hydroxy - 1'-naphthyl) naphthalide having the formula:

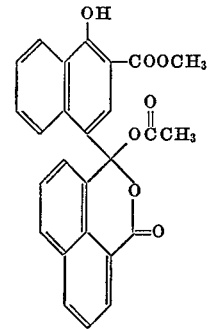

which was prepared as follows:

A mixture of 40.0 g. (0.1 mole) of 3-hydroxy-3-(3'-carbomethoxy - 4' - hydroxy-1'-naphthyl)naphthalide-1,8, 40 ml. of acetic anhydride (0.43 mole) and 60 ml. of glacial acetic acid was refluxed for about 2 hours with moderate stirring under nitrogen atmosphere. A white solid precipitated out of the red homogeneous solution after approximately 12 minutes. The reaction mixture was diluted with 200 ml. of a 35% solution of hexane in toluene (volume percent). After cooling the hexane-toluene suspension to room temperature, an additional 150 ml. of 35% hexane in toluene was added. The reaction mixture was cooled in a refrigerator (0° to 5° C.) overnight, filtered, washed with three 100 ml. portions of 35% solution of hexane in toluene and dried to give 42.70 g. (97% by weight yield), of the 3-acetoxynaphthalide as a snow-white solid, melting range 218–22° C. (dec.). Purity by high pressure liquid-liquid chromatography 97.3 to 100%.

(1) To a 300 ml. 3-neck flask equipped with mechanical stirrer, nitrogen atmosphere and a 20 ml. Dean Stark trap was added 150 ml. benzene. The benzene was refluxed at least 30 min. to dry the solvent and the apparatus, the trap removing 25 ml. from the initial solvent volume. After the benzene had cooled to 25° C., 9.12 g. (0.02 mole) of 2-carboxy-6-octadecyloxy-1-naphthol, 10.6 g. (0.024 mole) of the above monoacetate intermediate and 0.095 g. (1.0 m. mole) of pyridine N-oxide were added in sequence. The mixture was heated to reflux over a 15 min. interval with rapid stirring and maintained at reflux for 15 minutes. At this point, the apparatus was converted to downward distillation, and most of the benzene, originally 125 ml., was stripped over a 30 minute period at atmospheric pressure. A total of 83 ml. was removed allowing 42 ml. of benzene to remain in the reaction mixture, an easily stirred slurry.

(2) Acetonitrile, 100 ml., was added causing nearly total precipitation of product and the solvent mixture was distilled without fractionation. After 100 ml. was collected, b.p.~75–79° C., a second 100 ml. portion of acetonitrile was added and another 100 ml. of solvent was collected (b.p. 79–81° C.). An index of refraction check of the distillate (boiling at 81° C.) revealed pure acetonitrile, confirming the almost complete removal of the benzene. The reaction slurry, containing 42 ml. acetonitrile as solvent, was treated with 96 ml. butyl formate and brought to reflux to complete solution. A final portion, 22 ml., of acetonitrile was carefully added to bring the solvent combination to 60:40 butyl formate:acetonitrile. The solution was cooled to 50° C. in 30 minutes and to 25° C. during the next hour. Crystals started appearing above 60° C. The mixture was stirred at 25° C. for 10–18 hours. The granular solid was filtered and twice reslurried for 20 min. in fresh 100 ml. portions of acetonitrile. After drying in vacuo at 60° C., the product comprising dye precursor weighed 14.32 g. (85.5% by weight) and was analyzed as 94% pure by visible absorption in ethanolic sodium hydroxide. The dye precursor was again crystallized from 60:40 butyl formate:acetonitrile to a purity of 97+%.

(3) A mixture of 6.0 g. of dye precursor obtained above (97+% pure), 40 ml. isopropanol and 40 ml. water was rapidly stirred at 25° C. under nitrogen and treated with 8.0 ml. of 50% aqueous sodium hydroxide. The reaction was heated to 45° C. over a 30 min. period and held at 45° C. for one hour. The two phase alkaline solution was added, while warm, to a rapidly stirring mixture of 380 ml. water, 18.6 ml. concentrated hydrochloric acid and 12.6 ml. acetic acid over a 10 minute period. The temperature of precipitation was kept between 30° and 35° C. After the slurry had stirred for one hour at 30° C., the granular solid was filtered, reslurried in 300 ml. water at 25° C. for 30 minutes, filtered and dried at 60° C. in vacuo. The off-white solid comprising dye product weighed 5.75 g. and had a visible absorption $\epsilon(648 \text{ nam.}) = 36.9 \times 10^3$, indicating 98% purity. The overall yield of dye at this stage was 85% by weight based on the carboxy-naphthol starting material.

(4) Exactly 6.00 g. of powdered 98% pure dye product and 60 ml. methanol were heated under nitrogen to reflux, over 15 minutes, with rapid stirring, and held at reflux for 30 minutes.

The slurry was allowed to air cool with stirring and kept at 25° C. for 1½ hours. Addition of 20 ml. methanol and stirring for two minutes thinned the thick slurry. The white solid was filtered, washed with 35 ml. methanol and vacuum dried at 60° C. The yield of final dye having a visible absorption $\epsilon(648 \text{ nm.}) = 37.1 \times 10^3$ (Standard=$37.1 \times 10^3$), was 5.57 g. (93% by weight). This represents an overall yield of title compound of 79% by weight based on 2-carboxy-6-octadecyloxy-1-naphthol.

In the above procedure, the dye precursor formed in step 1 may be isolated by complete removal of the benzene and hydrolyzed directly without purification. To facilitate final purification of the dye product, however, the dye precursor usually is purified prior to the hydrolysis step by crystallization from an appropriate solvent, for example, methyl ethyl ketone or dimethoxyethane combined with acetonitrile. Alcohols such as isopropanol or 2-butanol may also be used. Particularly preferred as the crystallization solvent is 60:40 butyl formate:acetonitrile, since this system give high recovery (80–82%) of highly pure precursor (96+%) in a single crystallization.

The final purification of step (4) may be carried out employing different solvent systems. For example, the dye product has been purified using a ternary system of tetrahydrofuran-butyl formate-acetonitrile as follows:

Exactly 5.00 g. of 97% pure dye product was dissolved in 7.5 ml. tetrahydrofuran and 7.5 ml. n-butyl formate by heating to reflux with rapid stirring under nitrogen. After an additional 10 minutes of reflux, 17.5 ml. butyl formate was added dropwise such that reflux was maintained. Finally 17.5 ml. acetonitrile was added in like manner. The homogeneous solution was stirred and the solvent mixture distilled at atmospheric pressure until a total of 12.5 ml. of distillate was collected. Crystallization occurred during the latter part of the distillation. Heat was then removed and the mixture allowed to come to room temperature while stirring was continued for a further 18 hours. The white solid was filtered and the cake rinsed with 10 ml. methanol. The solid was then reslurried in 25 ml. cold methanol for 30 minutes, filtered and rinsed with 8 ml. methanol. After vacuum drying at 65°, the final dye had a visibile absorption of $\epsilon(648 \text{ nm.}) = 36.8 \times 10^3$ (Standard=$37.1 \times 10^3$). The yield was 4.45 g. (89% by weight).

Example 2

Step 1 of Example 1 was carried out in the following manner:

To a 300 ml. 3-neck flask equipped with mechanical stirrer, nitrogen atmosphere and a 20 ml. Dean Stark trap was added 150 ml. benzene. The benzene was refluxed at least 30 min. to dry the solvent and the apparatus, the trap removing 25 ml. from the initial solvent volume. After the benzene had cooled to 25° C., 4.56 g. (0.01 mole) of 2-carboxy-6-octadecyloxy-1-naphthol, 4.42 g. (0.01 mole) of the above monoacetate intermediate and 0.095 g. (1.0 m. mole) of pyridine N-oxide were added in sequence. The mixture was heated to reflux over a 15 min. interval with rapid stirring and maintained at reflux for 3 hours. At this point, the apparatus was converted to downward distillation, and the benzene was removed under vacuum. The solid residue was dissolved in 60 ml. of hot isopropanol. A solution of 12 ml. of 50% sodium hydroxide diluted with 60 ml. of water was added and the resulting mixture was stirred for one hour at 60°. After cooling to room temperature, the hydrolyzate mixture was added to a stirred solution of 28 ml. of conc. hydrochloric acid and 19 ml. of acetic acid in 570 ml. of water. The resulting mixture was stirred for 15 min., filtered, and the solid was washed with water. After drying at 60° C. in a vacuum oven, the crude solid dye weighed 8.18 g. and had a visible absorption $$\epsilon(648 \text{ nm.}) = 31.8 \times 10^3$$

(Standard=$37.1 \times 10^3$) in ethanolic sodium hydroxide, indicating an overall 85% by weight conversion.

Example 3

Example 2 was repeated substituting 0.019 g. of 4-picoline N-oxide for pyridine N-oxide. After the hydrolysis there were obtained 8.42 g. of a crude dye which exhibited an absorption $\epsilon(648 \text{ nm.}) = 29.5 \times 103$ in ethanolic sodium hydroxide, which indicated an overall conversion of 80.5%.

Example 4

Example 2 was repeated substituting 0.179 g. (0.1 mole equivalent) of hexamethyltriphosphoramide for pyridine N-oxide. The resulting crude dye weighed 8.37 g. and showed $\epsilon(648 \text{ nm.}) = 29.1 \times 103$ equivalent to an overall conversion of 79.5%.

The 1-hydroxy-6-octadecyloxy-2-naphthoic acid employed in the above Examples was prepared by adding sodium methoxide (67.4 gms., 1.35 mole) to a solution of 1,6-dihydroxy-naphthalene (100 gms., 0.625 mole) in 900 ml. of dry N,N-dimethylformamide saturated with dry carbon dioxide gas. A steady flow of carbon dioxide was maintained throughout the reaction. Approximately 125 ml. of dimethylformamide was distilled and the mixture was then refluxed for 15 minutes and an additional 125 ml. of solvent removed. The solution was cooled and the flow of carbon dioxide stopped. The reaction mixture was acidified with concentrated hydrochloric acid and then poured onto about 2000 gms. of ice. The precipitated dark solid was filtered and dried and then triturated with 1 liter of boiling benzene and filtered free of dark impurities. Recrystallization from water gave 1,6-dihydroxy-2-naphthoic acid as a white solid (melting range 220°–221° C.).

To a well-stirred slurry of 1,6-dihydroxy-2-naphthoic acid (5.1 gms., 0.025 mole) in 50 ml. of dry isopropyl alcohol under nitrogen was added potassium t-butoxide (5.65 gms., 0.050 mole). The mixture was heated to reflux and stirred 10–15 minutes and then octadecylbromide (8.35 gms., 0.025 mole) was added. The reaction was refluxed for 5 hours, cooled and acidified with 20% hydrochloric acid. The solid which precipitated was filtered and dried and recrystallized from absolute ethanol to give 3.8 gms. of grey solid. Further recrystallization from chloroform gave 2.3 gms. of 1-hydroxy-6-octadecyloxy-2-naphthoic acid as a white solid (melting range 164°–165° C.).

As noted above, the indicator dyes produced in accordance with the present invention are useful as optical filter agents in photographic processes, and because of their relatively high pKa, are particularly useful in diffusion transfer processes employing highly alkaline processing solutions. Their use as optical filter agents in photographic processes is disclosed and claimed in U.S. Pat. No. 3,702,245 of Myron S. Simon and David P. Waller, filed Jan. 4, 1971. Certain 1-naphthol naphthalides including carboxy-substituted 1-naphthol naphthalides form the subject matter of copending U.S. patent application Ser. No. 103,865 of Myron S. Simon, filed Jan. 4, 1971.

Since certain changes may be made in the above process without departing from the scope of the invention herein involved, it is intended that all matter contained in the above description shall be interpreted as illustrative and not in a limiting sense.

What is claimed is:

1. A method of preparing 1-naphthol naphthalide indicator dyes which comprises:
   (A) reacting (a) about 1.0 to 1.5 moles of a 3-OX-3-(3'-lower carboalkoxy - 4' - hydroxy-1'-naphthyl) naphthalide wherein X is an acyl radical of an organic mono- or dicarboxylic acid and (b) about 1.0 mole of a 2-carboxy-1-naphthol in an inert organic solvent at a temperature not exceeding about 85° C. in the presence of about 0.01 to 2.0 moles of a highly polar compound having a dipole moment higher than 3.7 selected from pyridine N-oxide, 4-picoline N-oxide, dimethylformamide, dimethylacetamide, dimethyl sulfoxide and hexamethyltriphosphoramide to form the corresponding 3-(3'-lower carboalkoxy-4' - hydroxy - 1' - naphthyl)-3-(3''-carboxy-4''-hydroxy-1''-naphthyl) naphthalide dye precursor and
   (B) hydrolyzing said dye precursor to form the corresponding 3 - (3'-carboxy-4'-hydroxy-1'-naphthyl)-3-(3''-carboxy-4''-hydroxy - 1'' - naphthyl)naphthalide dye product.

2. A method as defined in claim 1 wherein said naphthalide (a) is a

3-(3'-lower carboalkoxy-4'-hydroxy - 1' - naphthyl)naphthalide wherein R is an alkyl group containing 1 to 10 carbon atoms.

3. A method as defined in claim 1 wherein said solvent is an aromatic hydrocarbon.

4. A method as defined in claim 3 wherein said hydrocarbon solvent is benzene.

5. A method as defined in claim 1 wherein said polar compound is pyridine N-oxide.

6. A method as defined in claim 1 wherein said polar compound is 4-picoline N-oxide.

7. A method as defined in claim 1 wherein said polar compound is hexamethyltriphosphoramide.

8. A method as defined in claim 1 wherein said polar compound is dimethylformamide.

9. A method as defined in claim 1 wherein said polar compound is dimethylacetamide.

10. A method as defined in claim 1 wherein said polar compound is dimethyl sulfoxide.

11. A method as defined in claim 1 wherein said naphthol (b) is 2-carboxy-6-octadecyloxy-1-naphthol.

12. A method as defined in claim 11 wherein said naphthalide (a) is 3-acetoxy-3-(3'-carbomethoxy-4'-hydroxy-1'-naphthyl)naphthalide.

13. A method as defined in claim 1 wherein said temperature is between about 60° and 85° C.

References Cited

Awad et al., J. Org. Chem., vol. 25, pp. 1872–74.

MILDRED A. M. CROWDER, Primary Examiner